May 3, 1955     T. W. MUNFORD     2,707,628
WATER-COOLED SUPPORT RAILS FOR FURNACES

Filed April 19, 1954     4 Sheets-Sheet 1

INVENTOR
T. W. Munford
BY Charles P. Haughey
atty

May 3, 1955  T. W. MUNFORD  2,707,628
WATER-COOLED SUPPORT RAILS FOR FURNACES
Filed April 19, 1954  4 Sheets-Sheet 2

INVENTOR
T. W. Munford
BY
Charles N. Haughey
atty

May 3, 1955  T. W. MUNFORD  2,707,628
WATER-COOLED SUPPORT RAILS FOR FURNACES
Filed April 19, 1954  4 Sheets-Sheet 3

INVENTOR.
T. W. Munford
BY Charles A. Haughey
atty

May 3, 1955 T. W. MUNFORD 2,707,628
WATER-COOLED SUPPORT RAILS FOR FURNACES
Filed April 19, 1954 4 Sheets-Sheet 4

INVENTOR.
T. W. Munford
BY
Charles S. Haughey
atty

United States Patent Office 2,707,628
Patented May 3, 1955

2,707,628

WATER-COOLED SUPPORT RAILS FOR FURNACES

Theodore W. Munford, Toledo, Ohio, assignor to Surface Combustion Corporation, Toledo, Ohio, a corporation of Ohio Application April 19, 1954, Serial No. 423,979

8 Claims. (Cl. 263—6)

This invention relates to rails for supporting work which is passed through a high temperature heating chamber such as in a high heat head, or fast heating, billet heating furnace. While it is known to use parallel and adjacent water-cooled rails for supporting work through such furnaces, it has been customary to support each rail independently of the other rails. Such independent support has been accomplished by notched refractory support piers, or by suitable cross rail members which enter through one side wall of the furnace, cross the heating chamber under the work support rails, and pass out the opposite side of the furnace. Various other support rail structures have been devised; some require a multiplicity of water-cooled pipe supports passing through the floor of the furnace, and some employ stagnant loops between adjacent rails through which water, or other coolant, is free to pass, but positive control of flow therethrough is not achieved.

Where the furnace chamber is circular in section and is heated by a whirling stream of burning gases next adjacent the inner refractory wall thereof, as is the situation in a high temperature heating chamber, it is particularly undesirable to have a multiplicity of water supplied pipes passing through furnace walls, because such pipes interfere with combustion, and because, in any refractory lined furnace, a difference in degree of expansion is to be expected between the lining and the cold support rails, so that allowance must be made for such difference.

The use of high temperature heating chambers is a relatively new development in the furnace art. In the early stages of this development a furnace design was evolved which was capable of maintaining an extremely high temperature wall about the furnace chamber. This furnace design made possible the heating of billets for hot working, in a scaling atmosphere, at a rate sufficiently high that the billets were almost free from scale. As a result of such rapid heating die life and press productive capacity increased several times and a remarkable economy resulted. Even after perfection of the furnace per se, however, commercial use was impossible. No known economic engineering material could be used as a work support rail at the temperatures involved. It was not found to be possible to insulate the rails, as is suggested in U. S. Patent 2,022,649, because no insulating material was found that was capable of withstanding the temperatures involved. Failure of the insulation invariably resulted, followed by rail failure.

It was found that bare rail structures of relatively small diameter as shown in Patent 2,652,240 were capable of withstanding the temperatures encountered in such high temperature heating chambers if an adequate supply of clean cooling water was circulated therethrough. However, under actual conditions encountered in many commercial installations, it has been found that such rail structures are not reliable. There are parallel paths for the flow of coolant through the structures so that the deposit of a small amount of silt, mud, lime, or other impurity at any point in the system, with resultant increase in resistance to flow of coolant through that portion of the system, causes increased flow of coolant through other portions of the structure, decreased flow of coolant through the plug portion, and thereby an increased rate of deposition of foreign matter in the already plugged portion. The ultimate result is complete failure of coolant flow through a part of the system, and resultant rail failure by overheating. So far as is known, prior to the instant invention, there was no rail structure for use in high temperature heating chambers that was capable of reliable operation under conditions often encountered in commercial practice.

The present invention is based upon the discovery of an improved support rail structure where the rails are internally cooled in a uniform manner without the use of control valves, where adjacent rails are secured with respect to each other by water-cooled members which receive coolant from the rails and, therefore, require no specially provided coolant, and where the rail securing members are easily fabricated and serviced, and in other respects are improvements over the prior art.

For a further consideration of the novelty of this invention attention is directed to the following portion of this specification, to the attached drawings, and to the concluding claims hereof:

Figure 1:
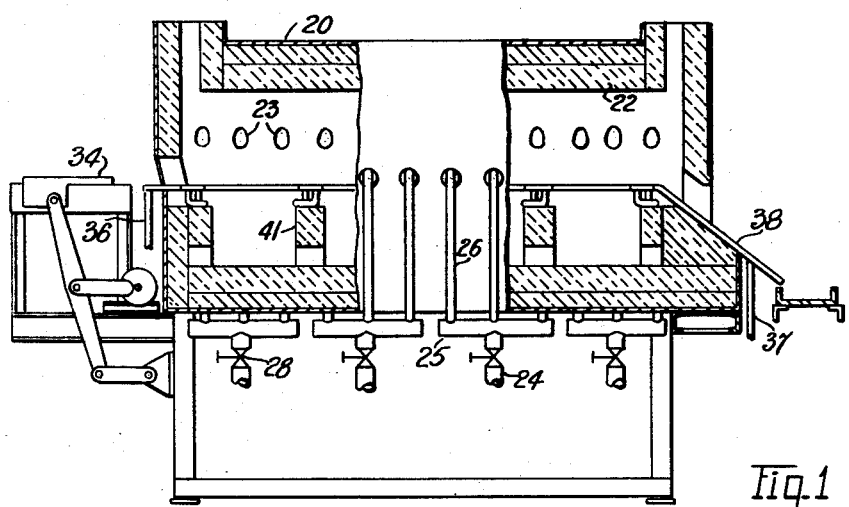
Fig. 1 is a partial longitudinal vertical sectional view of a furnace embodying this invention.
Figure 2:
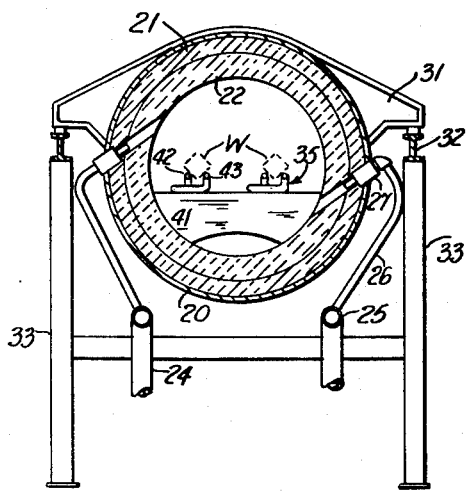
Fig. 2 is a lateral vertical sectional view of the furnace of Fig. 1.

The furnace illustrated in Figs. 1 and 2 of the drawings has a cylindrical heating chamber formed by a steel shell 20, a layer of insulating material 21 next adjacent the shell, and an inner refractory lining 22 which is preferably formed of very high temperature refractory material which also has good insulating properties. A series of burner ports 23 is formed in the wall of the furnace and each port is so designed as to discharge tangentially into the furnace chamber for combustion therein of fully aerated fuel supplied thereto by fuel supply mains 24, manifolds 25, burner pipes 26 and burners 27. The furnace lends itself to zone control of temperature between pillars 33 by adjustment of valves 28 in the mains 24. The heating chamber is supported by arms 31 secured to the shell 20 and resting on horizontally extending rails 32, which in turn rest on the pillars 33.

Work W is charged into the furnace by a pusher mechanism having a pusher head 34, the work pieces being charged ahead of the head 34 one at a time, either mechanically or by hand. The work is conveyed endwise through the furnace chamber on water-cooled support or skid rails generally indicated at 35, the rails being supplied with water by a water supply pipe 36 at the charge end of the furnace, a return pipe 37 being supplied at the discharge end to carry water from the rails. A downwardly inclined portion 38 of the rails 35 is utilized to rapidly discharge the work from the high temperature discharge zone of the furnace.

The rails 35 are supported on a refractory bridge 41 having a passage thereunder for purposes of cleaning out the furnace and for circulation of gases and distribution of heat. The water-cooled rails are preferably formed of as small a tubular section as will carry the load to reduce the radiation cooling of the furnace and the "shadowing" effects of cooling the work. By supporting the rails spaced from the bridges 41, a shadowing effect of the bridges is also reduced, as is readily perceived, it being understood that the work is heated primarily by radiation from the refractory lining 22 of the furnace chamber, and also by convection of gases past the work both of which are increased by spacing the rails from the bridges.

Figure 3:
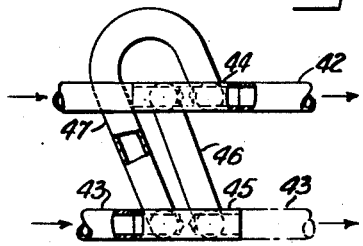
Fig. 3 is a plan view of a portion of the skid rails of the furnace in Fig. 1.
Figure 4:
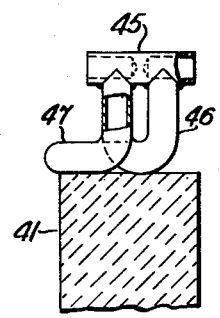
Fig. 4 is an elevation view of the skid rails of Fig. 3.
Figure 5:
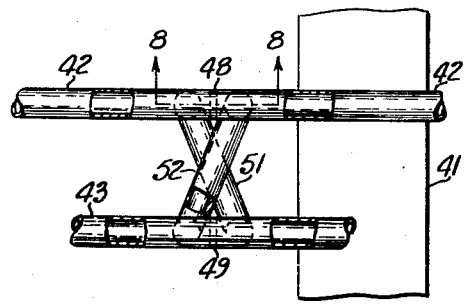
Fig. 5 is a plan view on an alternate structure to that shown in Fig. 3.
Figure 6:
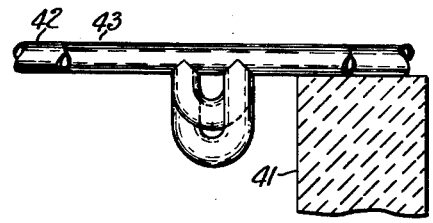
Fig. 6 is an elevation view of the rail structure of Fig. 5.

The rails generally indicated at 35 comprise parallel and adjacent pairs of rails 42 and 43 upon which the work is supported as it is pushed through the furnace chamber and discharged therefrom. Cross rails, or cross rail sections provide a uniform flow of coolant, generally water, through adjacent rails with a minimum of water supply and return pipes, none of which pierce the furnace wall, and maintain adequate cooling and proper spacing of the rails 42 and 43. One form of the cross rail sections is illustrated in plan in Fig. 3 wherein a pair of plugged connectors 44 and 45 having downwardly facing apertures on either side of the plugged portion thereof are connected by crossed loops 46 and 47 which are connected to the connectors 44 and 45 in a manner to close said apertures and with the depending loops 46 and 47 adapted to rest on the top surface of a bridge 41. The rail sections illustrated are adapted to be welded to straight sections of rail pipes or tubes to form the rails 35, and when assembled the cooling water will pass through rail 42 to connector 44 on the upstream side thereof, through the upstream aperture into loop 46 and across to the downstream aperture in connector 45 in rail 43, thence the flow continues in rail 43. Similarly, cooling water entering rail 43 upstream of connector 45 will flow through loop 47 to the downstream aperture in connector 44. While it is preferred to rest the loops 46 and 47 on the bridges 41 to support the rails thereabove, many advantages of the rails and connector sections are obtained if the loops are suspended in the furnace chamber between bridges or piers and serve primarily to space the rails, as shown in Figs. 5 and 6.

Figure 7:
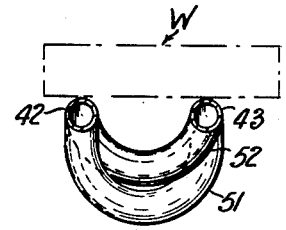
Fig. 7 is an end view of the rails of Fig. 5.
Figure 8:
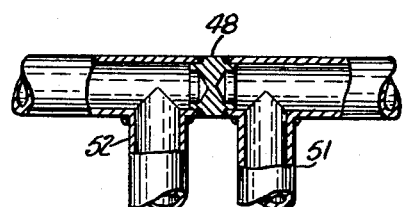
Fig. 8 is a detail view of a rail joint as made in Fig. 5.

An alternate construction of the cross rail sections of the rails 35 utilizes a pair of connectors 48 and 49 (see particularly Figs. 5, 7 and 8) of reduced size which serve primarily to plug the rails 42 and 43, and the downwardly facing apertures upstream and downstream of the connectors 48 and 49 are in the ends of each of the connected sections of the rails 42 and 43. Loops 51 and 52 are cross-connected to the rails in a manner similar to that of loops 46 and 47 and cooling water flow is as before described.

Figure 9:
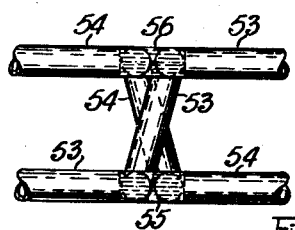
Fig. 9 is a plan view of a second alternate structure to that shown in Fig. 3.

Another alternate construction which is more difficult to fabricate but is functionally the same as above described is illustrated in Fig. 9, wherein single rails 53 and 54 are bent to form in a continuous piece of pipe straight rail sections and a cross loop, and pairs of such formed rails are then assembled and welded together with bridge weldments 55 and 56 to form straight parallel rail sections and cross loops having a cooling water flow as before.

Figure 12:
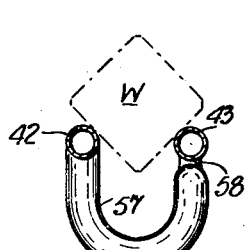
Fig. 12 is an end view of the structure of Fig. 11.
Figure 11:
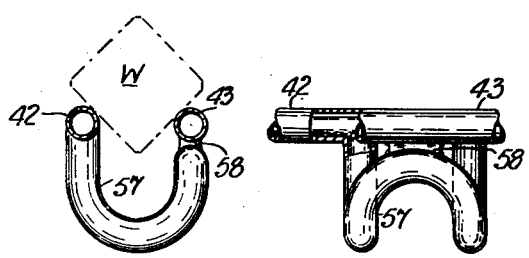
Fig. 11 is an elevation view of a third alternate structure to that shown in Fig. 3.
Figure 10:
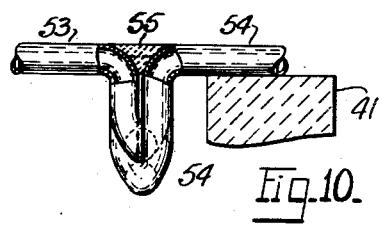
Fig. 10 is an elevation view of the structure shown in Fig. 9.

Another alternate construction which gives many of the advantages of the preferred connector sections is illustrated in Figs. 11 and 12 wherein a single loop 57 is run from one side of a plug in rail 42 across and next under rail 43 to which it is secured by weldment 58, and the loop is run back to the other side of the plug in rail 42. No plug is here needed in rail 43, and all loops at one joint are supplied with cooling water from rail 42. The loops 57 may of course be fed from alternate sides through the length of the furnace chamber to avoid having a higher resistance to flow in one of the paired rails and a greater heat load therefor.

Figure 13:
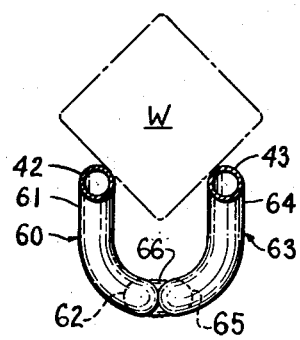
Fig. 13 is an end view of a modified skid rail structure similar to that shown in Figs. 11 and 12.
Figure 14:
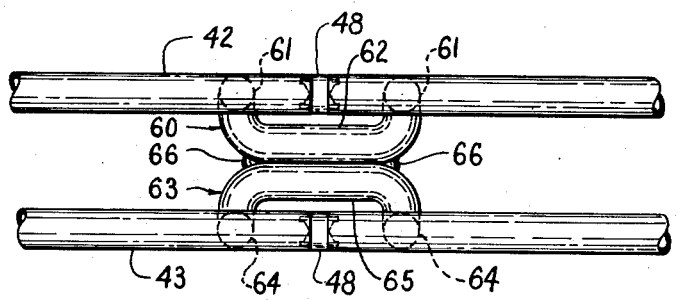
Fig. 14 is a plan view of the structure of Fig. 13.

A cross rail connector section closely related to that shown in Figs. 11 and 12 is represented in Figs. 13 and 14. A loop indicated generally at 60 has two downwardly extending portions 61 attached to the rail 42, which portions bend in a horizontal direction at their lower extremities and are there joined by a horizontally extending portion 62 which is parallel to the rails 42 and 43. A similar loop indicated generally at 63 is attached to the rail 43, and is composed of downwardly extending portions 64 which bend horizontally toward the rail 42 and are attached to a horizontal portion 65 which butts against or is closely adjacent to the similar portion 62. A weldment 66 makes the portions 62 and 65 of the loops 60 and 63 structurally integral with one another. Plugs 48 are placed in the rails 42 and 43 intermediate the points of attachment of the downward portions 61 and 61 of the loop 60 and intermediate the downward portions 64 and 64 of the loop 63.

Figure 15:
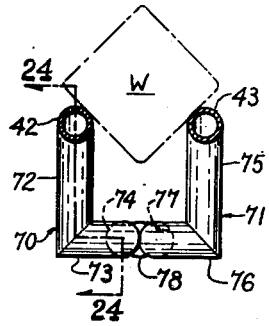
Fig. 15 is an end view of a skid rail structure showing a connector having coolant flow paths therethrough which follow the same course as the connector shown in Figs. 13 and 14, but showing a modified embodiment that can be fabricated with much greater facility.
Figure 16:
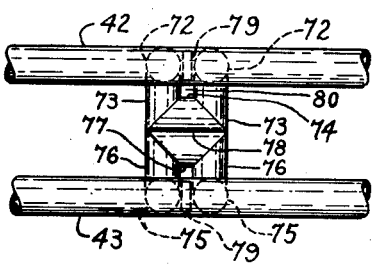
Fig. 16 is a plan view of the structure of Fig. 15.
Figure 17:
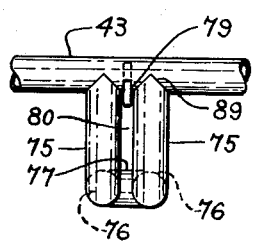
Fig. 17 is a view in elevation of the structure of Fig. 15.
Figure 21:
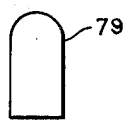
Fig. 21 is a front view of a plug particularly adapted for use in the structures shown in Figs. 15 through 17 and in Figs. 18 through 20.
Figure 22:
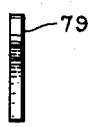
Fig. 22 is a side view of the plug of Fig. 21.

It has been found that a preferred way for fabricating connectors of the type represented in Figs. 13 and 14 is by using what has been denominated a "mitered" construction, as represented in Figs. 15, 16 and 17. The connector shown in these views of the drawings is composed of loops indicated generally at 70 and 71. The loop 70 has two vertical sections 72, two parallel, horizontally extending portions 73, and a single horizontally extending portion 74 connecting the two portions 73. The loop 71 is composed of two vertically extending portions 75, two parallel, horizontally extending portions 76, and a single horizontal portion 77 connecting the two portions 76. A weldment 78 makes the two connectors 70 and 71 structurally integral. Plugs 79, shown in more detail in Figs. 21 and 22, are positioned in the rail 42 intermediate the portions 72, and in the rail 43 intermediate the portions 75. It is preferred that the entire connector assembly, composed of the loops 70 and 71, be stiffened by a weldment 80 (see Fig. 17) between each pair of parallel portions, namely 72—72, 73—73, 76—76, and 75—75.

Figures 18, 19:
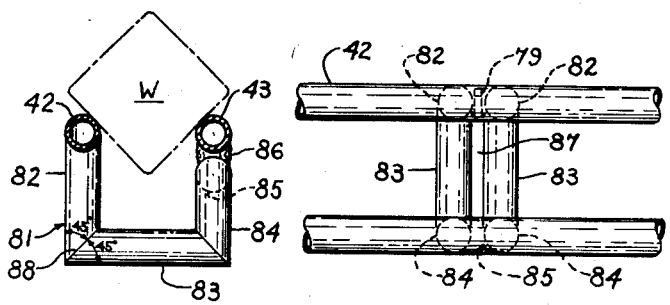
Fig. 18 is an end view of a skid rail structure having a connector with coolant flow paths which follow the same relative course as those in the structure of Figs. 11 and 12, but made by a different fabrication technique which substantially simplifies the production thereof.
Fig. 19 is a plan view of the rail structure of Fig. 18.
Figure 20:
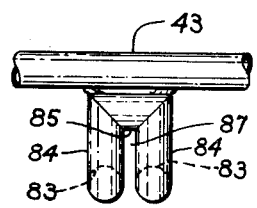
Fig. 20 is a view in elevation of the structure of Fig. 18.

A preferred way for fabricating the connector of Figs. 11 and 12 is shown in Figs. 18 through 20. The connector is composed of a single loop indicated generally at 81, and composed of two vertical portions 82 attached to and extending downwardly from the rail 42, two substantially parallel and horizontal portions 83 connected to the lower extremities of the portions 81, two vertical portions 84 extending upwardly from the outer extremities of the portions 83, and a single horizontal portion 85 parallel to the rails 42 and 43 which connects the upper extremities of the portions 84. A weldment 86 connects the portion 85 of the loop connector 81 to the rail 43. A plug 79 prevents axial flow of coolant through the rail 42. A weldment 87 joins the parallel portions of the loop connector 81, namely the two portions 82, the two portions 83, and the two portions 84, thereby substantially increasing the strength and rigidity of the structure.

The same type of "mitered" construction is used in fabricating the connectors of Figs. 15 through 17 as is used in fabricating the connectors of Figs. 18 through 20. For example, in Fig. 18, a joint 88 has been indicated as inclined at an angle of 45° to the vertical edge of the conduit 82, and also at an angle of 45° to the horizontal edge of the conduit 83. This joint, and other joints in the loops 70, 71 and 81 of the structures of Figs. 15 through 20 are readily produced by providing lengths of conduit of appropriate size with ends tapered at an angle of 45°, mating such lengths of conduit as shown in the drawings, and welding the mated lengths together around the joint between them. It will be readily apparent that all joints in the loops 70, 71 and 81 can be produced in a like manner and that, while 45° angles are most convenient for large production, other angles could be used if desired.

In order to connect the loops 70, 71 and 81 to the rails 42 and 43, as will be apparent from an examination of Fig. 17, lengths of conduit are tapered and inserted in a mating opening cut in the pipe 43; the assembly is completed by a weldment along the line 89, where the length of tapered conduit meets the rail 43. In the specific structure shown in Fig. 17 the taper of each of the conduit portions 75 is such that the two tapered parts lie in planes which meet along a line that also lies in a plane through the axis of the conduit, and each of the planes intersects such third plane at an angle of 45°. The mating opening in the rail 43 is made by two saw cuts which meet in a horizontal plane through the axis of the rail 43, and expose edges of the walls of the rail. The exposed edges lie in planes which meet in a line that also lies in a horizontal plane through the axis of the rail 43 with which horizontal plane each of the two first mentioned planes makes an angle of 45°.

The plug 79 shown in Figs. 21 and 22 is merely a flat plate having a width between its two parallel sides equal to the internal diameter of the rails 42 and 43, having a third side perpendicular to the two parallel sides, and a semi-circular upper portion. In order to install the plug 79 in a rail it is necessary only to make a vertical saw cut of the necessary width in the lower portion of the rail 42 or 43 terminating at the horizontal center line of the rail. The plug 79 can then be inserted in this saw cut and secured there by appropriate weldment.

Figure 23:
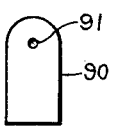
Fig. 23 is a view in elevation of a plug similar to that of Fig. 21, but having an orifice which has been found to be useful in some structures for effecting aspiration of coolant from a connector.

A plug 90 shown in Fig. 23 is identical with the plug 79 of Figs. 21 and 22 except that it is provided with an opening 91 having, in the embodiment illustrated, a cross sectional area approximately one third the inner cross sectional area of the rails 42 and 43.

Figure 24:
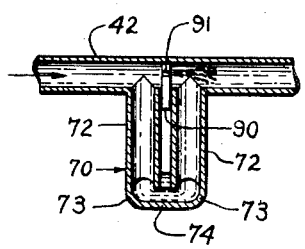
Fig. 24 is a view in cross section along the line 24—24 of Fig. 15 showing the aspiration effect which can be achieved by using the plug of Fig. 23.

It has been found that completely satisfactory flow of coolant can be achieved when the plug 90 is used. It will be apparent that the plug 90, by virtue of the opening 91 therein permits some coolant to flow radially through the rail 42 or 43 (see Fig. 24) and thereby decreases the amount of coolant flowing through the loop 70. However, the discharge of coolant through the opening 91, closely adjacent and above the opening from one of the portions 72 of the loop 70, into the rail 42 has an aspirating effect, which compensates for the diminished flow. It will also be observed that the plug 90 is used only in the mitered construction where each portion of a connector is positioned closely adjacent another similar portion, and preferably welded thereto, so that each such portion is at least partially shadowed by another such portion, with the result that the heat burden thereon is substantially reduced. As a consequence, excellent results have been achieved with the plug 90 in this type of structure.

The improved rails of this invention are characterized by cross flow of coolant at each connector section, and positive one-way series flow of coolant through each connecting loop as well as each rail section, and may be considered as an improvement over the rails disclosed in application Serial No. 196,582, filed November 20, 1950 by J. D. Nesbitt now Patent No. 2,652,240.

This application is a continuation-in-part of application Serial No. 261,247, now abandoned, which was filed December 12, 1951, and entitled "Water-Cooled Support Rails for Furnaces."

I claim:

1. A connector assembly for substantially parallel internally cooled rail structure for supporting work in a furnace chamber, the assembly consisting of first and second connectors adapted to form, respectively, portions of first and second rails, said first connector having a plug therein dividing the connector into an upstream end and a downstream end, and said second connector having a plug therein dividing the connector into an upstream end and a downstream end; a first conduit interconnecting the upstream end of the first connector and the downstream end of the second connector in coolant transferring relation; and a second conduit interconnecting the upstream end of the second connector and the downstream end of the first connector in coolant transferring relation whereby to form a first series coolant flow path from the upstream end of the first rail through the first conduit and to the downstream end of the second rail, and a second series coolant flow path from the upstream end of the second rail through the second conduit and to the downstream end of the first rail.

2. A connector assembly as claimed in claim 1 wherein a portion of the first rail in coolant transferring relationship to the upstream end of the first connector, the upstream end of the first connector, the first conduit, the downstream end of the second connector, and a portion of the second rail in coolant transferring relationship with the downstream end of the second connector are formed by a single length of shaped conduit, and a portion of the second rail in coolant transferring relationship to the upstream end of the second connector, the upstream end of the second connector, the second conduit, the downstream end of the first connector, and a portion of the first rail in coolant transferring relationship with the downstream end of the first connector are also formed by a single length of shaped conduit.

3. In a skid rail structure comprising substantially parallel internally cooled rails for supporting work in a furnace chamber, the improvement which consists in a connector assembly forming a portion of a first one of said rails, means in said connector preventing coolant flow therethrough axial to said first rail, and dividing said connector into an upstream end and a downstream end; a conduit interconnecting at its ends, in coolant transferring relationship, the upstream and downstream ends of said connector; said conduit, intermediate its ends, butting against and welded to a portion of a second of such substantially parallel rails.

4. A connector assembly as claimed in claim 3 wherein the first rail, the connector, and the conduit are formed by a single length of shaped conduit.

5. In a skid rail structure comprising substantially parallel internally cooled rails for supporting work in a furnace chamber, a connector assembly which consists of first and second connectors forming, respectively, portions of first and second rails, means in said first and second connectors obstructing coolant flow therethrough axial, respectively, to said first and second rails, and dividing the same into upstream and downstream ends, a first conduit interconnecting the upstream and downstream ends of the first connector, a second conduit interconnecting the upstream and downstream ends of the second connector, said first conduit butting against and welded to said second conduit.

6. A connector assembly as claimed in claim 5 wherein the first rail, the first connector, and the first conduit are formed by a single length of shaped conduit, and the second rail, the second connector, and the second conduit are also formed by a second single length of shaped conduit.

7. Internally cooled rail structure adapted to support work in a furnace chamber, which structure consists of substantially parallel rails forming series flow rail coolant passages therethrough, a rail interconnector joining said rails between the ends thereof, said interconnector comprising coolant flow obstructing means in at least one of the said coolant passages dividing same into an upstream portion and a downstream portion, one conduit for each of said means, each said conduit being in coolant receiving relationship to one such upstream portion and in coolant delivering relationship to one such downstream portion, and forming a portion of the coolant passages of the rail structure, each said conduit, intermediate its ends, butting against and welded to a portion of a second of such rails.

8. A connector assembly as claimed in claim 3 wherein there is unobstructed, axial, coolant flow through the portion of the second of such rails which the conduit butts against and is welded to.

References Cited in the file of this patent

UNITED STATES PATENTS

| | | |
|---|---|---|
| 645,305 | Wellman et al. | Mar. 13, 1900 |
| 1,551,945 | Fitch | Sept. 1, 1925 |
| 2,022,649 | Corriston | Dec. 1, 1935 |
| 2,276,326 | Martensson | Mar. 17, 1942 |
| 2,519,566 | Hamm | Aug. 22, 1950 |

FOREIGN PATENTS

| | | |
|---|---|---|
| 387,705 | Germany | Jan. 3, 1924 |